United States Patent [19]

Yamane et al.

[11] 4,148,972
[45] Apr. 10, 1979

[54] HEATSEALABLE POLYPROPYLENE FILM LAMINATE

[75] Inventors: Toshihiro Yamane; Katsuhiro Tsuchiya, both of Otsu, Japan

[73] Assignee: Toray Industries, Inc., Tokyo, Japan

[21] Appl. No.: 808,795

[22] Filed: Jun. 22, 1977

[30] Foreign Application Priority Data

Jun. 22, 1976 [JP] Japan .................................. 51-72732

[51] Int. Cl.$^2$ ............................................. B32B 27/08
[52] U.S. Cl. .................................... 428/515; 428/516; 428/910; 264/171
[58] Field of Search ....................... 428/516, 515, 910

[56] References Cited

U.S. PATENT DOCUMENTS

| | | | |
|---|---|---|---|
| 3,355,319 | 11/1967 | Rees ................................. | 428/497 X |
| 3,496,061 | 2/1970 | Freshour et al. ................ | 428/516 X |
| 3,671,383 | 6/1972 | Sakata et al. .................... | 428/516 X |
| 3,882,259 | 5/1975 | Nohara et al. ................... | 428/516 |

*Primary Examiner*—P. C. Ives
*Attorney, Agent, or Firm*—Miller & Prestia

[57] ABSTRACT

A polypropylene film laminate is made by laminating at least one side of a polypropylene layer comprising 1–8 wt. % ionomer with an ionomer layer.

This film is produced by coextruding polymers from a die, and is useful for automatic packaging applications at high speed.

7 Claims, No Drawings

HEATSEALABLE POLYPROPYLENE FILM LAMINATE

BACKGROUND OF THE INVENTION

This invention relates to a heatsealable laminated film and to the method for production of the film.

It is well known to produce a heatsealable film by laminating polypropylene film with an ionomer as described in U.S. Pat. No. 3,355,319 and Japanese Patent Publication No. 46-40793.

The films described in U.S. Pat. No. 3,355,319 are film laminates made by extruding an ionomer resin onto one surface of a biaxially oriented polypropylene film as shown in Example XII of the patent. However, this film has the following disadvantages:

(1) This film exhibits weak adhesive strength between the polypropylene base layer and the ionomer layer with the result that a weak heatseal is formed when the base layer is homopolypropylene and the film is made by laminating a biaxially oriented polypropylene film with an ionomer resin without stretching.

(2) When the film is made by laminating one side of the base layer with ionomer, it curls easily.

The method described in Japanese Patent Publication No. 46-40793 relates to a process for the production of heatsealable film laminates comprising laminating a uniaxially oriented polypropylene film with an ionomer, and thereafter stretching the laminated film in the transverse direction. The adhesive strength between two layers of this film is relatively improved by transverse stretching after lamination in comparison with that of the film described in U.S. Pat. No. 3,355,319, but this film also has the following disadvantages:

(1) This film exhibits thickness variations or surface roughness because the stretching ratio cannot increase, and the ionomer layer sticks to the chill roll when the laminated layer is thin.

(2) When this film is made by laminating one side of the base layer with an ionomer, it curls easily because there is an orientation difference between the two layers. When this film curls, it cannot be fed into automatic packaging machines and cannot practically be used for automatic packaging applications.

(3) When the ionomer is laminated on a uniaxially oriented polypropylene film, delamination between the ionomer layer and polypropylene layer often takes place on the nip roll so that the ionomer easily adheres to the roll. Thus, it is difficult to commercially produce this type of film because of the delamination problem.

Accordingly, it is an object of this invention to remove these disadvantages without sacrificing good heat sealing properties, transparency, and scratch resistance.

The present invention provides a laminated polypropylene film comprising a base layer of polypropyleneionomer blend coated with ionomer layer(s), wherein the blend consists of 92 to 99 wt. % polypropylene and 1 to 8 wt. % ionomer. By blending 1 to 8 wt. % ionomer into the base layer, most of aforementioned disadvantages are removed and, hence, good laminated film can be made.

This invention also relates to a method for the preparation of film laminates by a coextrusion process. It should be pointed out that it is difficult to co-extrude film laminates comprising a base layer of homopolypropylene coated with ionomer layer(s), as described in U.S. Pat. No. 3,355,319 and Japanese Patent Publication No. 46-40793 for the following reason:

When the coextruded laminate is stretched in the longitudinal direction, the ionomer layer sticks to the preheating rolls because the melting point of the ionomer is lower than the temperature at which polypropylene film is longitudinally stretched. Therefore, it is very difficult to make laminated film by the conventional stretching process.

This sticking tendency becomes worse when the film is commercially produced at high speed. If the longitudinal stretching temperature is lowered in order to avoid sticking between the film and rolls, the film has a very high molecular orientation and, hence, tends to split along lines parallel to the stretching direction, which leads to a film break when it is transversely stretched. If the film is stretched under the same conditions without very high orientation, it cannot be commercially used for packaging applications because of poor mechanical properties such as low tensile strength, low Young's modulus, and large elongation, etc.

Another method to avoid sticking is to use nonsticky rolls, such as fluoro-resin covered rolls and special rubber-covered rolls, in the longitudinal stretching process, but these rolls are not satisfactory for the present purpose.

In the present invention, the orientation of the film laminae is lowered by blending 1 to 8 wt. % ionomer into the loose layer. Accordingly, film laminae, having suitable orientations, can be obtained by lower stretching temperatures. Therefore, the film laminae can be produced by a coextrusion process without adhesion to the roll.

Heretofore, when polypropylene and an ionomer have been co-extruded, the boundary layer or layers between the two resins exhibit a propensity to become rough (hereinafter, this phenomanon is referred to as "boundary roughening"). Therefore, the biaxially oriented film has poor transparency and gloss. This boundary roughening is considered to be caused by the difference of viscosity and shear rate at the boundaries, and by the difference of volume shrinkage when molten polymers become solid. This roughening tendency becomes worse with the decreasing thickness of the coextruded ionomer layer or layers.

Prior art biaxially oriented polypropylene films laminated with an ionomer layer have a propensity to curl. This propensity causes trouble in packaging machines or bagmaking machines. A desirable curl ratio is less than 10 percent, preferably less than 5 percent.

In addition to the aforementioned disadvantages, the laminated films made in accordance with the prior art have other disadvantages, such as poor gauge control and poor adhesion strength between the base layer and laminated layer or layers.

The present invention presents a distinct improvement over the known prior art in the above-mentioned characteristics.

In the present invention, boundary roughening is improved with the results of good gloss and transparency, because the incorporation of an ionomer into the base layer reduces the differences of melt viscosity, shear rate and volume shrinkage between the base and laminated layer or layers. The ionomer can be regarded as a polymer compatible with polypropylene if the amount of ionomer is limited.

The incorporation of ionomer into the base layer inhibits the formation of very high molecular orientation in the longitudinal stretching zone. In other words, the optimum stretching temperature can be lowered by about 5–15 deg. C by the incorporation of an ionomer. Therefore, the film of this invention can be easily stretched, without sticking, on stretching rolls covered with fluoro-resin or special rubbers.

The cast film in accordance with this invention has a highly uniform surface due to the good contact between the casting drum surface and the ionomer layer, resulting in the improvements of neck-down, film surface roughness, stretchability, gauge control and curling propensity.

Moreover, the adhesive strength between both layers in the cast film is improved by blending an ionomer into the polypropylene base layer.

Further, a film made from a polypropyleneionomer blend has been proposed by British Pat. No. 995,802. However, this invention relates to films having improved dyeability. Further, the disclosed film exhibits poor heatsealability since it is mono-layered film, not laminated film.

SUMMARY OF THE INVENTION

This invention relates to a heat-sealable film laminate exhibiting improved heat sealing properties comprising a base layer of a polypropylene-ionomer blend wherein the blend comprises 92 to 99 wt. polypropylene and 1 to 8 wt. % ionomer; the base layer having a laminated ionomer layer on at least one surface thereof.

Further, this invention relates to a process for the production of a heatsealable film laminate exhibiting enhanced heat sealing properties which comprises a base layer of a polypropylene-ionomer blend having a laminated ionomer layer on at least one surface thereof. The process comprises coextruding an ionomer and a polypropylene-ionomer blend (the blend comprising 92 to 99 wt. % polypropylene and 1 to 8 wt. % ionomer) from a die to laminate at least one side of the polypropylene-ionomer blend with the ionomer, and stretching the laminae at a temperature higher than the softening point of the ionomer resin.

An object of the invention is to provide polypropylene film laminates having good heatsealability.

Another object of the invention is to provide film laminates suitable for high speed automatic packaging applications.

Still a further object of the invention is to provide a process for the production of polypropylene film laminates that have good heatsealability.

These and other objects are met by the present invention. The foregoing will be further explained in the following detailed description.

DETAILED DESCRIPTION OF THE INVENTION

Polypropylene in this invention is conventional high isotactic polypropylene resin, which has more than 70 wt. %, preferably more than 90 wt. %, residue when extracted with boiling normal heptane. The polypropylene may be a homopolymer of propylene or a random or block-copolymer of propylene with a small amount of ethylene, butene or pentene, preferably less than 5 wt. %. Depending on applications of the laminated film of this invention, additives such as stabilizers, anti-oxidants, ultraviolet-ray absorbers, plasticizers, antistatic agents, inorganic fillers, organic slip agents, pigments, and coloring agents may be added to polypropylene base layer.

Ionomer used in this invention means the ionic copolymers which consist of $\alpha$-olefins having a carbon number 2 to 4 (as described in U.S. Pat. No. 3,264,272) and $\alpha,\beta$-ethylenically unsaturated carboxylic acids having a carbon number 3 to 6 and which contains one or more metallic ions connected to side chains of the polymer.

The uncomplexed metal ions suitable for forming the ionic copolymers of the present invention comprise mono, di or tri-valent metal ions in the Group I, II, III, IV-A and VIII of the Periodic Table of Elements. The preferred examples are $Na^+$, $K^+$, $Li^+$, $Cs^+$, $Ag^+$, $Hg^+$, $Cu^+$, $Be^{++}$, $Mg^{++}$, $Ca^{++}$, $Sr^{++}$, $Ba^{++}$, $Cu^{++}$, $Cd^{++}$, $Hg^{++}$, $Su^{++}$, $Pb^{++}$, $Fe^{++}$, $Co^{++}$, $Ni^{++}$, $Zn^{++}$, $Al^{++}$, $Sc^{+++}$, $Fe^{+++}$ and $Yt^{+++}$. In the various ions mentioned above, the most suitable ion is $Zn^{++}$ and another suitable ion is $Na^+$.

The ionomer used in this invention generally comprises more than 50 wt. %, preferably 75 to 95 wt. %, of $\alpha$-olefine and 5 to 25 wt. % of $\alpha,\beta$-ethylenically unsaturated carboxylic acid. The preferred ionomer for this invention is ethylene-methacrylic acid copolymer having 75 to 95 wt. % of ethylene components. Depending on end use applications, conventional additives such as inorganic fillers and organic slip agents may be incorporated into the ionomer resins.

Although every aforementioned ionomer resin can be used in this invention, it is desirable to choose an ionomer having a melt viscosity close to that of polypropylene so that a high quality film will be produced by the coextrusion method. The desirable melt viscosity ratio of base layer to ionomer is 1–10. To employ an ionomer having a desirable melt viscosity ratio, it is desirable to use an ionomer having a high degree of polymerization.

The laminated film of this invention can be prepared by various methods, one of which is shown below.

A polypropylene-ionomer blend containing 1–8 wt. % ionomer is coextruded with an ionomer to form a three-layered sheet which is then uniaxially or biaxially stretched. The laminated film thus obtained has good qualities such as, high adhesion strength between both layers, good gauge profile, and uniform surface. In addition to good quality, the production cost of the laminated films so produced is considerably reduced by the above-mentioned process, because laminated films can be directly made in a continuous line.

A desirable die for this process is the double-manifold die or multi-manifold die. However, a conventional single-manifold die can be used if the adapter, usually called a "black box", is provided just before the die. Plural polymer streams join together in this black box.

Also, it is possible to co-extrude a polypropylene-ionomer blend with an ionomer to form a two-layered sheet which is then uniaxially or biaxially stretched.

The suitable co-extrusion temperature is determined by the variation of ionomer, blend ratio of ionomer in base polypropylene layer, and the melt index of polypropylene.

The suitable ratio of melt viscosity of base layer to ionomer is 1–10, because melt flow of polymers in a die can be uniform and so that the film laminate has good thickness variation.

The coextrusion temperature is usually 240°–280° C.

It is desirable to uniaxially or biaxially stretch the cast laminated film and it is generally stretched biaxially.

The stretching temperature of this invention can be lowered by blending a small amount of ionomer into the base layer.

The stretching temperature of this present invention is difficult to ascertain. It changes due to the variation of polypropylene and ionomer, and the blend ratio of ionomer to base layer.

ented polypropylene film. Other sample films, No. 2–No. 5, have satisfactory properties.

Table 1

Relation between Ionomer content in the base layer and film properties

| Sample Number | Ionomer content in base layer (wt %) | Melt viscosity ratio at 260° C. | Haze (%) | Transverse gauge variation (%) | Heat shrinkage (%) after 15 minutes at 120° C. | Tensile strength (kg/mm²) | Curl ratio (%) | Adhesive strength between both layers in oriented sheet (g/cm) | Sticking tendency tudinal stretching rolls | Surface roughness |
|---|---|---|---|---|---|---|---|---|---|---|
| No. 1 | 0.5 | 7.2 | 2.0 | 13.5 | 2.5 | 22.7 | 5.0 | 25 | yes | slightly rough |
| 2 | 1 | 7.1 | 2.2 | 11.4 | 3.0 | 23.6 | 4.2 | 100 | slightly yes | smooth |
| 3 | 3 | 6.8 | 2.7 | 10.0 | 3.5 | 22.6 | 3.0 | 225 | no | smooth |
| 4 | 6 | 6.5 | 3.1 | 9.6 | 3.7 | 22.4 | 2.1 | perfect | no | smooth |
| 5 | 8 | 6.3 | 3.2 | 10.8 | 3.9 | 22.0 | 2.7 | perfect | no | smooth |
| 6 | 10 | 6.0 | 5.6 | 11.8 | 5.4 | 19.0 | 3.3 | perfect | no | smooth |

The longitudinally stretching temperature of the film laminae is practically within the range of 105°–125° C. The transversely stretching temperature of the film laminate is practically within the range of 130°–160° C.

The stretching ratio in the present invention is ordinally 3–7 times in the longitudinal direction and 4–10 times in the transverse direction. Heat treatment can be used after stretching. The heat treatment temperature is suitable within the range of 140°–160° C.

Moreover, a preferred condition of the present invention includes controlling the orientation of the ionomer layer when the cast film is stretched uniaxially or biaxially.

The following examples illustrate preferred embodiments of the present invention, and the invention should not be limited or narrowly construed thereto.

COMPARATIVE EXAMPLE I

As an ionomer resin, Surlyn 1706 having a melt flow index of 0.7 and made by Du Pont is used. Polypropylene-ionomer blends containing various amounts of ionomer are fed into the main extruder and extruded at 260° C. through the center manifold of a three-manifold die. Simple ionomer resin, Surlyn 1706, is fed into the sub-extruder and extruded at 260° C. through the side manifolds of the same three-manifold die. The three-layered sheet coming out of the die consists of the core layer of blends sandwiched by the ionomer layers. This sheet is longitudinally stretched by 5 times and, then, transversely stretched by 9 times at 150° C. in a tenter oven, followed by heat setting in heated air at 140° C., rapid cooling, and winding up. The three-layered film thus obtained has a total thickness of 18 microns. Physical properties are shown in Table 1 and include haze (%), transverse gauge variation (%), adhesive strength (g/cm) between layers is non-oriented sheets, sticking tendency to longitudinal stretching rolls, curl ratio (%), tensile strength (kg/mm²) and surface roughness.

The No. 1 sample film containing 0.5 wt. % ionomer in the base layer is poor in transverse gauge variation, curl ratio and adhesive strength between layers. Furthermore, the No. 1 film sticks to longitudinal stretching rolls because a high stretching temperature is required. On the other hand, No. 6 film sample containing 10 wt. % ionomer in the base layer is poor in haze, transverse gauge variation and heat shrinkage at 120° C. Moreover, the tensile strength is so weak that the No. 6 film is no longer a mechanically strong biaxially-ori-

EXAMPLE 1

95 weight parts of isotactic polypropylene powder and 5 weight parts of ionomer are completely blended by a V-shaped rotary blender. Each polymer used has the following characteristics.

Polypropylene: Inherent viscosity is 2.2 measured in tetralin at 135° C. Amount of residue is 97.0 wt. % when extracted with boiling n-heptane.

Ionomer: Surlyn 1706 manufactured by Du Pont. It is an ethylene-methacrylic acid copolymer containing 15 wt. % of acid, 60% of the total carboxyl groups are neutralized by zinc ions.

These additives are incorporated into the blend as 0.2 wt. % of phenolic antioxydant of 2,6-di-tertiary butyl-p-cresol 0.2 wt. % of metal salt of higher fatty acid of calcium stearate and 0.1 wt. % of hydrated silica particles, where wt. % of the additives is based on the weight of polypropylene-ionomer blend. The blend is pelletized by the conventional method to form pellets. These pellets are fed into the main extruder and extruded at 280° C. into the center manifold of a three-manifold die. Meanwhile, ionomer, Surlyn 1706, pellets are fed into the sub-extruder and extruded at 240° C. into the outside manifolds of the same die. The melt viscosity ratio of base layer to ionomer is 7.3 at 240° C. Coextrusion through the die makes a three-layered sheet with a thickness of about 600 microns. This sheet is longitudinally stretched by 5 times at 120° C. by using two pairs of nip rolls driven at different rotational speeds. This longitudinally stretched sheet is transversely stretched by 8.5 times at 1° to 5° C. in a tenter oven and, then, heat-set at 160° C. under such a condition that transverse relaxation takes place by 8 percent of total film width. The heat-set film is then quenched with a cold air jet and, then wound up after both edges are trimmed off. Physical properites of the three-layered film thus obtained are shown in Table 2. These properties are quite suitable for bag-making machines and automatic packaging machines, particularly for overwrapping machines.

Table 2

| Transverse gauge variation | 9.2% |
|---|---|
| Transverse curl ratio | 2.5% |
| Haze | 3.0% |
| Surface roughness | smooth |
| Adhesive strength between layers | improved |
| Sticking tendency to longitudinal | no sticking |

EXAMPLE 2

Table 3

Relation between property and composition of base layer

| Composition of base layer | | | | | | | | | |
|---|---|---|---|---|---|---|---|---|---|
| Polypropylene or Polypropylene/copolymer blends | Ionomer | Melt viscosity ratio at 240° C. | Haze | Transverse gauge variation (%) | Heatshrinkage after 15 minutes at 120° C. (%) | Tensile strength (kg/mm$^2$) | Young's modulus (kg/mm$^2$) | Curl ratio | Adhesive strength between both layers in non-oriented sheet (g/cm) | Surface roughness |
| Homopolypropylene 100 parts | Surlyn 1706 4 parts | 8.0 | 2.8 | 10.6 | 3.5 | 22.6 | 270 | 3.0 | 255 | smooth |
| Homopolypropylene/EPC 70 parts 30 parts *1 | " | 6.5 | 3.0 | 9.4 | 4.0 | 22.8 | 260 | 2.5 | 306 | " |
| Homopolypropylene/EPC 50 parts 50 parts *1 | " | 4.0 | 3.0 | 8.0 | 4.0 | 22.2 | 258 | 0.5 | 400 | " |
| Homopolypropylene/EPC 90 parts 10 parts *2 | " | 7.3 | 3.0 | 8.8 | 3.7 | 22.4 | 265 | 2.0 | 250 | " |
| Homopolypropylene/BPC 90 parts 10 parts *3 | " | 7.4 | 3.1 | 8.8 | 4.1 | 22.9 | 260 | 2.0 | 310 | " |
| Homopolypropylene 100 parts | Surlyn 1652 4 parts | 10.0 | 2.9 | 10.0 | 3.5 | 22.2 | 270 | 3.1 | 260 | " |

EPC*1 Sumitomo Noblen FA-6211 (Ethylene-propylene copolymer, Ethylene content = 2 wt. %)
EPC*2 Sumitomo Noblen FA-6411 (Ethylene-propylene copolymer, Ethylene content = 4 wt. %)
BPC*3 — (Propylene-butene copolymer, Butene content = 6.5 wt. % inherent viscosity = 2.19, melt flow index 2.1)
Homopolypropylene : Mitsui Toatsu Noblen JS inherent viscosity = 2.3, melt flow index = 1.0
Surlyn 1706 (Du Pont) melt flow index = 0.7 density = 0.97
Surlyn 1652 (Du Pont) melt flow index = 5.0 density = 0.94
Note: Surlyn 1652 is ethylene-methacrylic acid copolymer containing 9 wt. % of acid. 15% of the total carboxyl groups are neutralized by sodium ions.

Isotactic polypropylene powder is blended with various amounts of ethylene-propylene copolymer or butene-propylene copolymer powder. The polypropylene has an inherent viscosity of 2.3, measured in tetralin at 135° C., and 97.0 wt. % of residual fraction when extracted with boiling n-heptane. These powder blends are again blended with an ionomer resin by means of a V-shaped rotary blender. The blend ratio of ionomer is 4 weight parts per 100 weight parts of powder blends. Such additives are added into the polymer blends as 0.3 wt. % of phenolic antioxidant of 2, 6-di-tertiary butyl-1-cresol, 0.2 wt. % of metal salt of higher fatty acid of calcium stearate and 0.1 wt. % of hydrated silica particles, where all weight percentages are based on the total weight of the polymer blends. These blends are pelletized by the conventional method to form pellets. These pellets are fed into the main extruder and extruded at 270° C. to the center manifold of the three-manifold die. Meanwhile, the ionomer resin is fed into the sub-extruder and extruded at 240° C. to the outer two manifolds of the same die. The resulting coextruded sheet from the die consists of three-layers; the total thickness being about 700 microns. This sheet is longitudinally stretched by 5 times at 120° C. between two pairs of nip rolls with different peripheral speeds. The longitudinally stretched sheet is transversely stretched by about 8 times at 160° C. in a tenter oven, followed by heatsetting in heated air at 150° C. with 5% width reduction. Then, the film is rapidly cooled by air and would up. The properties of the film thus obtained are shown in Table 3. These properties are satisfactory for bag-making machines and automatic packaging machines, especially for over-wrapping machines.

We claim:

1. A heatsealable film laminate adapted for packaging comprising a base layer consisting essentially of a polypropylene-ionomer blend, wherein said blend comprises 92-99 wt. % polypropylene and 1-8 wt. % ionomer, said base layer having an ionomer layer affixed on at least one surface thereof.

2. The heatsealable film laminate defined in claim 1 wherein both said base layer and ionomer layer are biaxially oriented.

3. The heatsealable film laminate defined in claim 1 wherein a plurality of ionomer layers are provided, and wherein said layers are laminated on both sides of the base layer.

4. The heatsealable film laminate defined in claim 1 wherein the ionomer comprises a metal salt of an ethylene methacrylic acid copolymer.

5. The heatsealable film laminate defined in claim 1 wherein the ionomer comprises a zinc ion salt of an ethylene methacrylic acid copolymer.

6. The heatsealable film laminate defined in claim 4 wherein the ethylene content is more than 50 wt. % by total weight of the ionomer.

7. The heatsealable film laminate defined in claim 4 wherein the ethylene content is 75 to 95 wt. % by weight of the ionomer.

* * * * *

UNITED STATES PATENT AND TRADEMARK OFFICE
CERTIFICATE OF CORRECTION

PATENT NO. : 4,148,972
DATED : April 10, 1979
INVENTOR(S) : Toshihiro Yamane et al It is certified that error appears in the above-identified patent and that said Letters Patent are hereby corrected as shown below:

Col. 6, line 10, delete "oriented" and substitute therefor --non-oriented--.

Col. 6, line 10, delete "tudinal" and substitute therefor --to longitudinal--.

Col. 8, line 1, delete "would" and substitute therefor --wound--.

Col. 8, line 8, the word "Adhesive" should appear directly above the word "strength".

Signed and Sealed this

Thirty-first Day of July 1979

[SEAL]

Attest:

Attesting Officer

LUTRELLE F. PARKER
Acting Commissioner of Patents and Trademarks